(No Model.)  4 Sheets—Sheet 2.
T. R. TIMBY.
SUBTERRANEAN SYSTEM OF COAST DEFENSE.
No. 246,987. Patented Sept. 13, 1881.
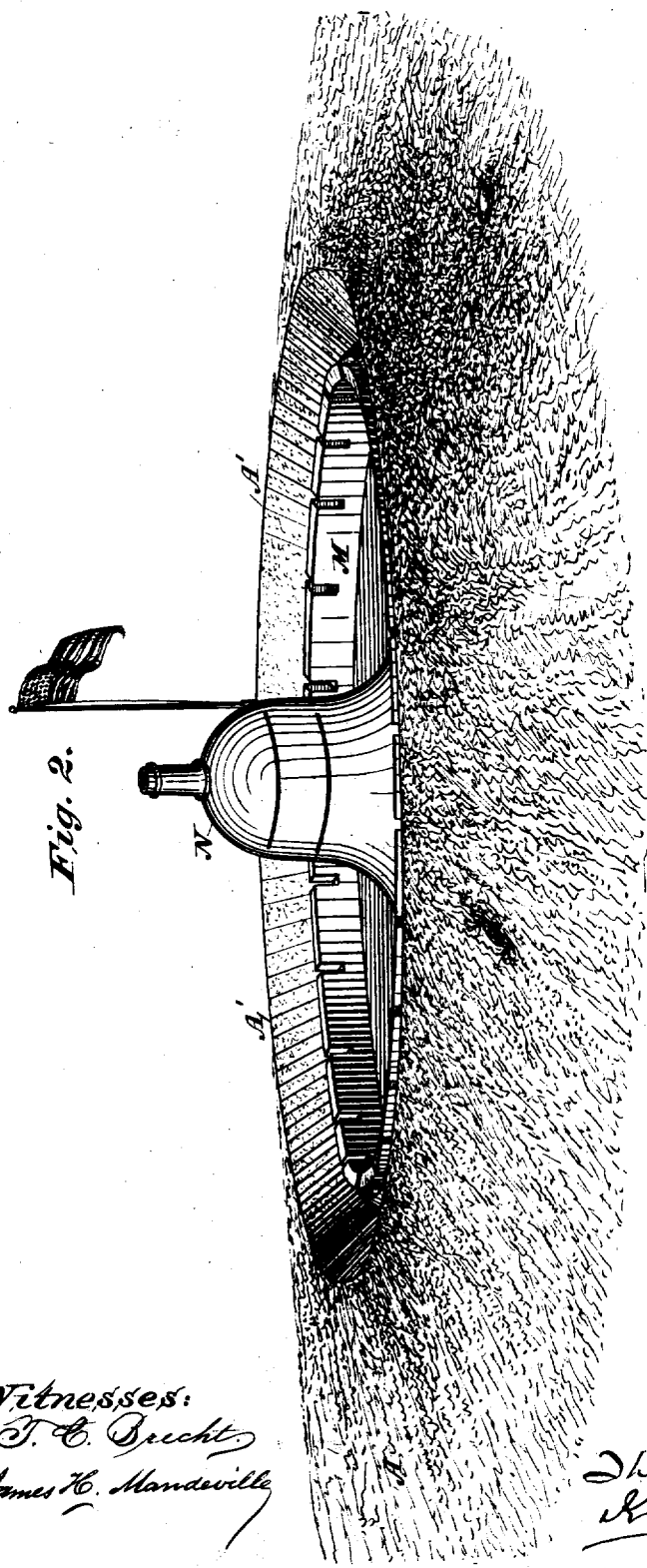

(No Model.) 4 Sheets—Sheet 1
T. R. TIMBY.
SUBTERRANEAN SYSTEM OF COAST DEFENSE.
No. 246,987. Patented Sept. 13, 1881.
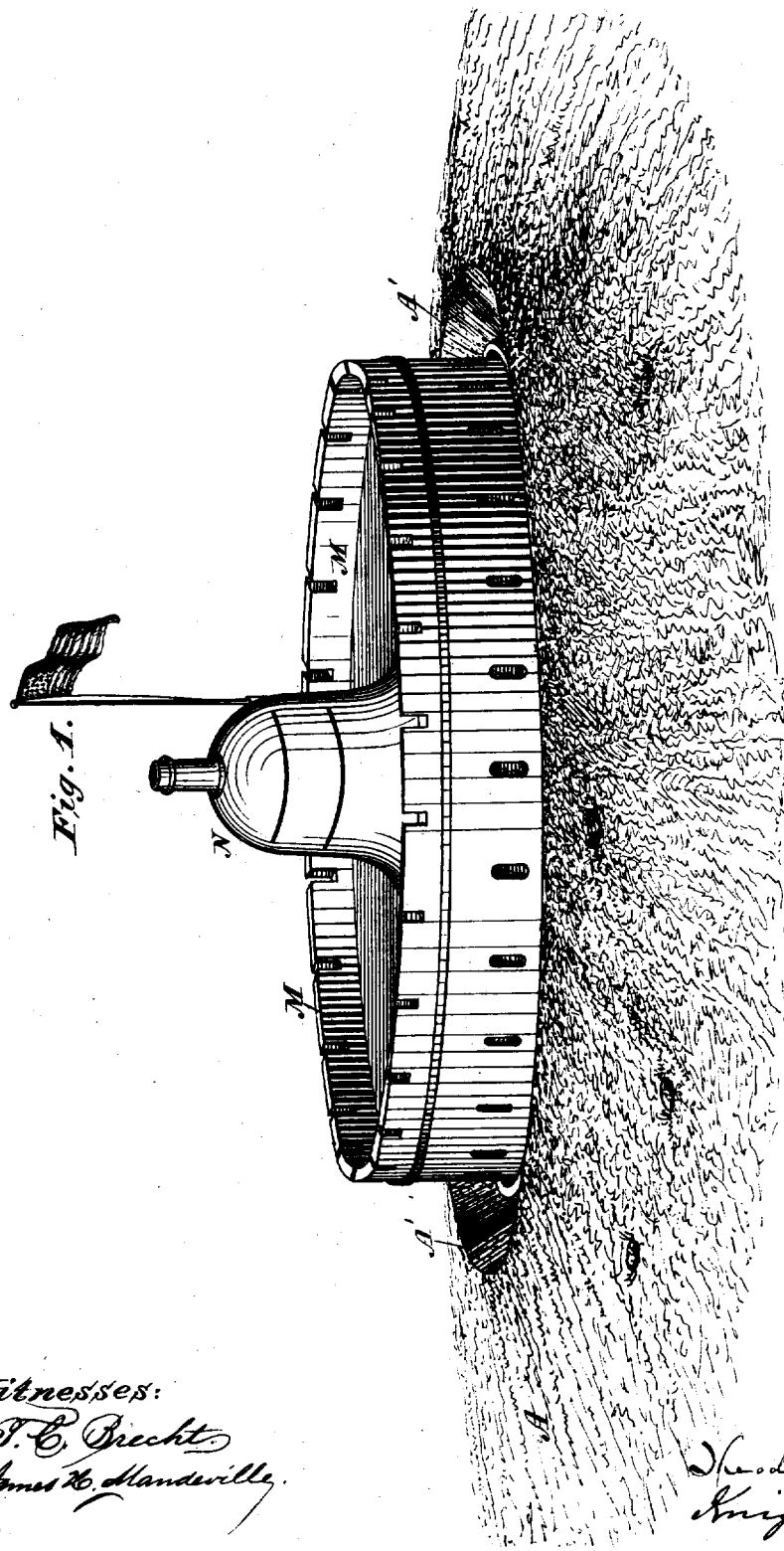

(No Model.) 4 Sheets—Sheet 3.
T. R. TIMBY.
SUBTERRANEAN SYSTEM OF COAST DEFENSE.
No. 246,987. Patented Sept. 13, 1881.
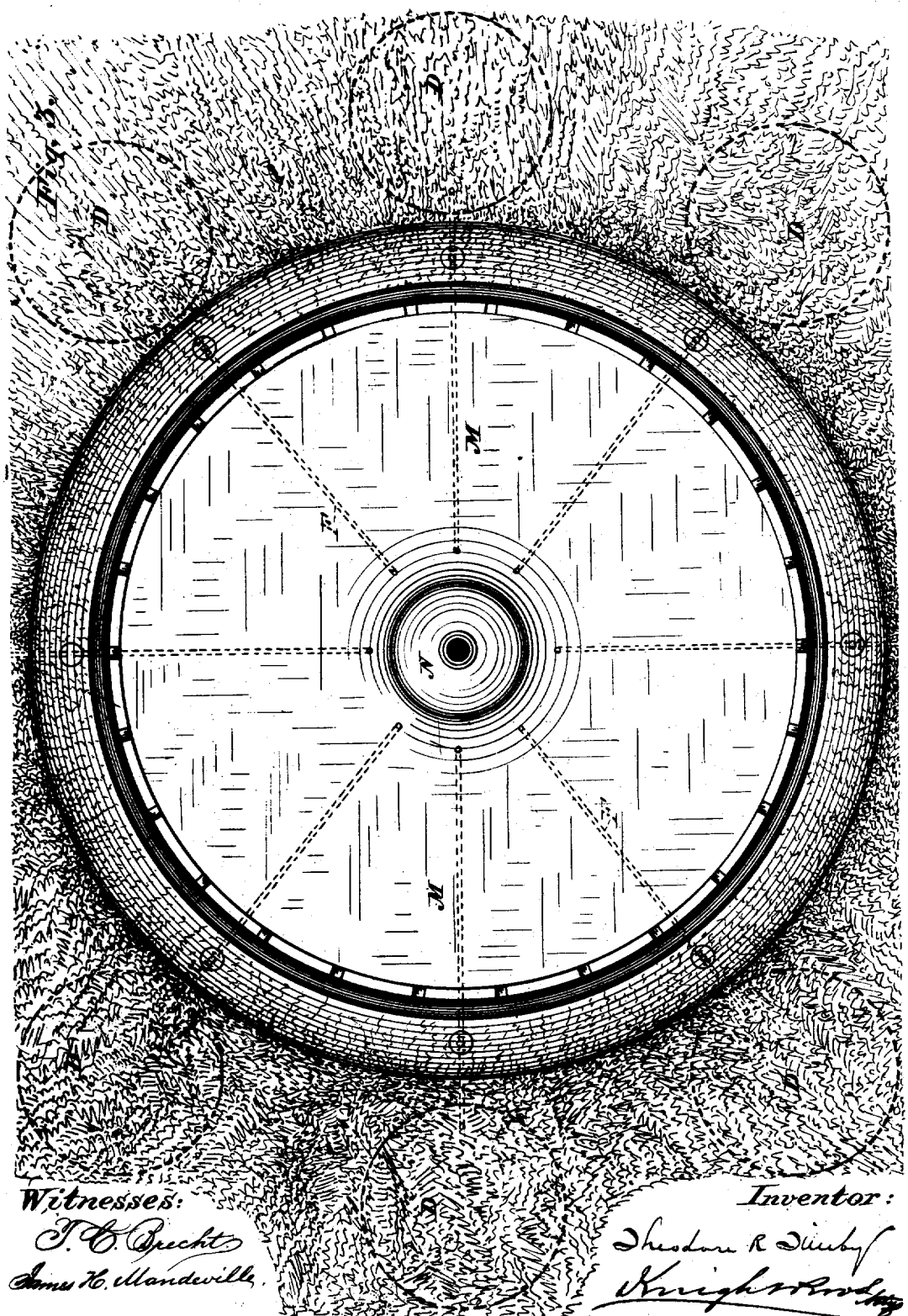

(No Model.) 4 Sheets—Sheet 4.
T. R. TIMBY.
SUBTERRANEAN SYSTEM OF COAST DEFENSE.
No. 246,987. Patented Sept. 13, 1881.
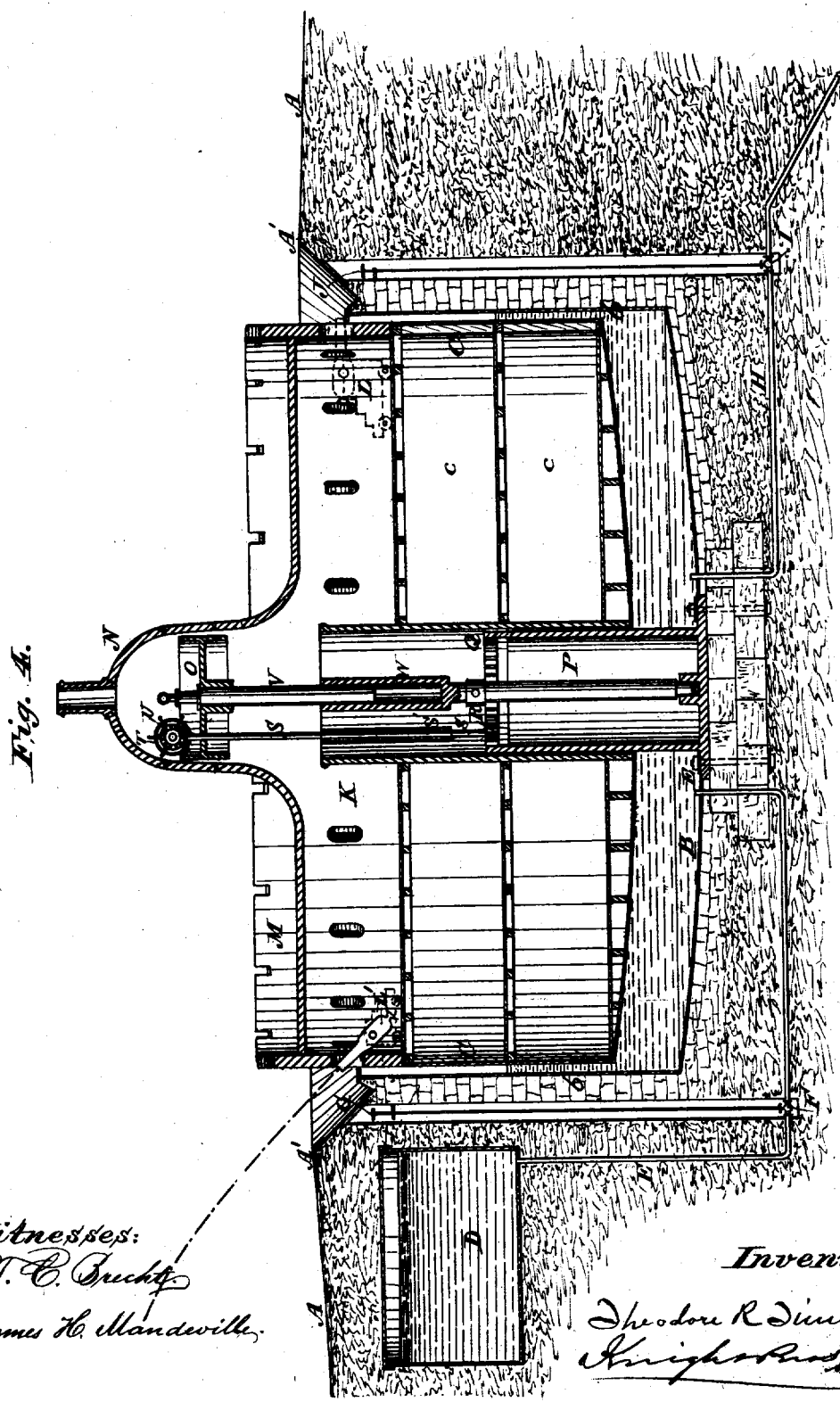
Witnesses:
Inventor:

UNITED STATES PATENT OFFICE.

THEODORE R. TIMBY, OF NYACK, NEW YORK.

SUBTERRANEAN SYSTEM OF COAST DEFENSE.

SPECIFICATION forming part of Letters Patent No. 246,987, dated September 13, 1881.

Application filed August 17, 1881. (No model.)

*To all whom it may concern:*

Be it known that I, THEODORE R. TIMBY, a citizen of the United States, residing at Nyack, in the county of Rockland and State of New York, have invented a Subterranean System of Coast Defense, of which the following is a specification.

The subject of my invention is a subterranean fortification, which, when not in use, may be lowered beneath or to the level of the surface of the ground, so as to be out of sight, and which admits of being so covered as to conceal all indications of a fortification or defensive work, and when needed for action may be quickly elevated, so as to present a fully-equipped fort, revolving or otherwise.

In the accompanying drawings, Figure 1 is a perspective view, showing the fort or tower elevated ready for action. Fig. 2 is a perspective view with the fort lowered. Fig. 3 is a plan. Fig. 4 is a vertical section, showing the fort partially elevated.

A A represent ground of any ordinary level, and B a pit of sufficient depth to receive the fort C. The pit B is provided with tight walls b, adapting it to hold water, which is supplied at will from any available source—as, for example, one or more tanks, D D D, through a conducting pipe or pipes, E, under control of cocks F, operated by hand-wheels G at any convenient point. The pipe E delivers the water in the lower part of the pit B, as shown in Fig. 4.

H is a waste-pipe for discharging water from the pit B, when desired, under control of a cock, I, operated by a hand-wheel, J, said pipe H delivering it to any suitable drain or outlet.

The lower part of the fort C is constructed with any desirable number of stories c c, which, being always below ground, may be used for storage and quarters, or for any other use, and may have comparatively light walls, being never exposed above the ground. The displacement thus provided affords ample flotation to the whole structure when water is let into the pit B from the tanks D.

The upper part of the fort is incased in thick armor-plating, or formed with heavy steel or iron walls, to render it impenetrable to shot, and constructed with a casemate, K, within which guns L are mounted on suitable carriages, to adapt them to be fired either horizontally or at any angle of elevation or depression through the embrasures, the structure being so arranged that the said casemate may be elevated completely above the level of the ground, as illustrated in Fig. 1, so as to operate as a fort with either a horizontal or a depressed fire, according to the height at which the tower is supported; or, if preferred, it may be elevated partially above the ground, as illustrated in Fig. 4, so that while the casemate is completely protected by the earth, as shown at A', the guns, being elevated at an angle, as illustrated at L', may throw shells after the manner of mortars, but with much greater effect and precision.

Above the casemate K the fort is constructed in the form of a barbette, M, in the center of which is a lookout-tower, N.

The entire fort is centered on a pillar, P, around which it is revolved by any suitable mechanism, which I deem it unnecessary to describe, because the application of such mechanism is within the knowledge of engineers, and suitable mechanism for this purpose is, moreover, described in patents heretofore granted to me for revolving towers and fortifications.

At the top of the pillar P is a fixed internal gear, Q, with which meshes a pinion, R, fixed to the lower end of a shaft, S, which is made in two parts connected by a sleeve, S', so that the upper part may move up and down together with the lookout-platform O, in which it has its bearings, while imparting rotation to the pinion R, and thereby to the said platform.

The shaft S may be conveniently rotated by a hand-wheel, T, connected with the shaft by bevel-gears U. The platform O is raised and lowered at will independently of the main structure by a piston, V, and cylinder W, constituting a hydraulic ram, into which the water is forced at will in customary manner.

The tanks D and pipes E and H may have any necessary capacity, so as to raise and lower the fort as rapidly as desired. In practice the said pipes will be of larger capacity than here shown. The water-supply may be near or remote.

Having thus described my invention, the following is what I claim as new therein and desire to secure by Letters Patent:

1. The combination of a water-tight pit in the earth, a buoyant fort centered to rotate within the said pit on a vertical axis, constructed with a casemate at top, which may be sunk completely within the pit, and a water-supply and connections of the required elevation and capacity to admit of raising the casemate out of the pit for action and lowering it within the pit for protection, all substantially as herein set forth.

2. The combination, with the pit B and revolving fort or tower C, of the sloped embankment A', to permit the discharge of guns at a moderate angle of elevation while protected from an enemy's fire, substantially as set forth.

3. The combination, with the floating and revolving fort or tower C, of the lookout-platform O, having an independent rotation within said floating and revolving tower, substantially as set forth.

4. The combination, with the water-tight pit B and the floating and revolving fort or tower C, of the lookout-platform O and suitable lifting appliances, V W, for raising and lowering said lookout-platform independently of the revolving fort or tower, substantially as set forth.

THEODORE R. TIMBY.

Witnesses:
OCTAVIUS KNIGHT,
J. L. CONDRON.